Patented Dec. 1, 1931

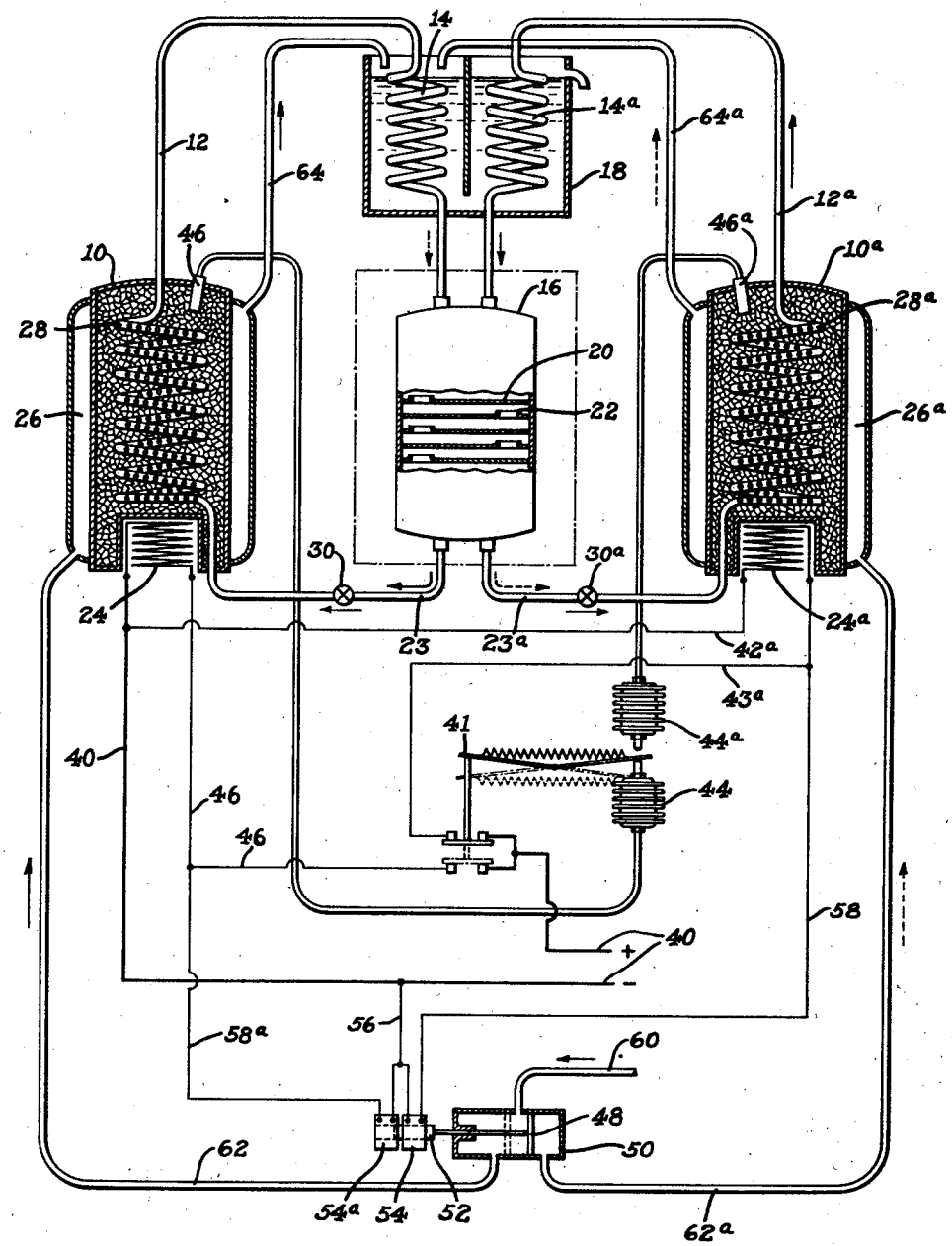

1,833,901

UNITED STATES PATENT OFFICE

HARRY B. HULL, OF DAYTON, OHIO, ASSIGNOR TO FRIGIDAIRE CORPORATION, OF DAYTON, OHIO, A CORPORATION OF DELAWARE

REFRIGERATING APPARATUS

Application filed July 1, 1929. Serial No. 375,129.

This invention relates to refrigerating apparatus of the absorption type.

One of the objects of the invention is to provide an improved refrigerating system in which a solid absorbent or adsorbent material is employed and in which a substantially uniform pressure is maintained throughout the apparatus at all times.

Another object is to provide an improved refrigerating system using a solid absorbent and adapted to supply continuous refrigeration.

Further objects and advantages of the present invention will be apparent from the following description, reference being had to the accompanying drawing, wherein a preferred form of the present invention is clearly shown.

The single figure of the annexed drawing is a diagrammatic illustration of one form of apparatus embodying the invention.

The system shown includes a pair of generator absorbers 10 and 10a each of which is charged with any suitable absorbent (including adsorbent) material, such as calcium chloride, activated charcoal, or silica gel, and which when heated discharges gaseous refrigerant such as ammonia thru a conduit 12 or 12a to a condenser 14 or 14a from which liquefied refrigerant flows into the upper part of an evaporator 16. The condensers may be immersed in a cooling tank 18 thru which water continuously flows. The evaporator may be of any suitable form, for example, a cylindrical drum provided with a number of trays or baffles 20 each of which has one or more openings surrounded by a vertical collar 22. These form pans which hold liquid to the level of the tops of the collars and permit excess liquid to over-flow thru the openings into the pans below. The pans are assembled with the openings out of alignment to cause the liquid refrigerant overflowing from any pan to be caught in the pans below. The bottom of the evaporator is connected to the generator absorbers thru refrigerant vapor return conduits 23 and 23a.

Each generator absorber may consist of a cylindrical shell filled with the absorbent material and heated by an electric heating element 24 or 24a placed in a suitable well, and cooled by water circulating thru a jacket 26 or 26a. Refrigerant enters and leaves the absorbent material thru a bleeder tube which may be a perforated helical coil 28 or 28a embedded in the material and connected between the vapor return conduit 23 or 23a and the refrigerant discharge conduit 12 or 12a.

The apparatus contains a quantity of inert gas, such as hydrogen, whose partial pressure equalizes the partial pressure of the refrigerant being evaporated and absorbed on the one hand and the pressure of the refrigerant being evolved and condensed on the other hand. In operation, one generator-absorber is heated, refrigerant being driven off from the absorbent and flowing to the condenser wherein it is liquefied and from which it flows to the evaporator, while the other generator-absorber is cooled to absorb refrigerant from the evaporator and produce evaporation therein. The evaporation and evolution of the refrigerant take place at the same total pressure due to the fact that the partial pressure of the evaporating refrigerant plus the partial pressure of the inert gas in the evaporator and cooled generator absorber equals the pressure of evolution of the refrigerant in the generator-absorbent being heated. The mixture of evaporated refrigerant and inert gas passes into the cooled generator-absorber which takes up and absorbs the refrigerant, liberating the inert gas from the mixture. The liberated inert gas then circulates back to the evaporator through the condenser associated with the cooled generator-absorber and becomes mixed with the evaporating refrigerant again.

The inert gas will be circulated downwardly through the evaporator and upwardly through the generator-absorber being cooled due to the difference in weight in the two columns of gas. The column of gas in the evaporator is a mixture of the inert gas and evaporated refrigerant and is cold, while the column of gas in the absorber is relatively warm and consists of inert gas alone which has been liberated from the refrigerant. Accordingly the column in the evaporator is heavier and will displace the column in the absorber.

When the refrigerant has been driven out of the heated generator-absorber, the heat is turned off and that generator-absorber is cooled. Simultaneously the generator-absorber previously cooled is now heated to evolve the refrigerant which it has absorbed. This arrangement produces substantially continuous refrigeration in the evaporator by alternate operation of the intermittent generator-absorbers.

In order to prevent any tendency of the refrigerant evolved from the generator-absorber being heated to enter the evaporator thru the return pipes 23 or 23a check valves 30 and 30a may be provided. These valves should be very light and require very slight pressure to open them. They are not intended to maintain any substantial difference in pressure between the opposite sides because the pressure throughout the system is uniform, but are merely to insure the proper direction of flow of the refrigerant being evolved.

Any suitable control system may be used for automatically heating and cooling the generator-absorbers. For example the heaters may be connected to electric mains 40 by means of a snap switch 41 which remains in either of two positions, and when in the full line position shown in the drawings closes the circuit thru wires 42a and 43a to energize heater 28a and breaks the circuit to heater 28. The switch may be moved to this position by a thermostat bellows 44 connected to a bulb 46 charged with any suitable expansible fluid and placed in thermal relation with the generator-absorber 10. Whenever the switch is in position to heat generator-absorber 10a, water is circulated thru the cooling jacket of generator-absorber 10 by the following arrangement. The piston valve 48 of a water switch 50 is operated to the full line position by a core 52 attracted by a solenoid 54 connected in parallel with the heater 28a by wires 56 and 58. When the piston is in this position water flows from a supply main 60 thru the conduit 62 to the jacket 26, thence by conduit 64 to the cooling tank 18. When the refrigerant has been driven out of generator 10a, the temperature of the absorbent rises and expands a thermostat bellows 44a connected to a charged bulb 46a. By this time the generator-absorber 10 has cooled sufficiently to permit the bellows 44 to contract out of the path of the switch. The expansion of bellows 44a moves the switch to the dotted line position, breaking the circuit to the heater 24a and solenoid 54, and establishing the circuit to the heater 28 thru wire 46 and to solenoid 54a of the water switch thru wires 56 and 58a. This heats generator 10 and pulls the piston of the water switch to the left, diverting the water from jacket 26 to jacket 26a thru pipe 62a to cool generator-absorber 10a, from which the water flows to the condenser tank by conduit 64a. Heating of 10 and cooling of 10a continues until refrigerant is exhausted in 10 when the thermostat 44 shifts the switch to its initial position to repeat the cycle. This continues indefinitely and automatically producing substantially continuous refrigeration in the evaporator.

While the form of embodiment of the present invention as herein disclosed, constitutes a preferred form, it is to be understood that other forms might be adopted, all coming within the scope of the claims which follow.

What is claimed is as follows:

1. Refrigerating apparatus comprising a pair of intermittently operated absorption machines, each machine including a generator-absorber and a condenser, an evaporator common to said machines, means for intermittently heating and cooling said generator-absorbers so that when one generator-absorber is being heated the other generator-absorber is being cooled, and means for maintaining the pressure within the generator-absorber being cooled substantially equal to the pressure within the generator-absorber being heated, comprising an inert gas circulating through said evaporator and through the generator-absorber being cooled.

2. Refrigerating apparatus comprising a pair of intermittently operated absorption machines, each machine including a generator-absorber and a condenser, an evaporator common to said machines, means for intermittently heating and cooling said generator-absorbers so that when one generator-absorber is being heated the other generator-absorber is being cooled, and means for maintaining the pressure throughout the apparatus substantially constant and comprising an inert gas circulating through the evaporator and through the generator-absorber being cooled.

3. Refrigerating apparatus comprising a pair of intermittently operated absorption machines, each machine comprising a generator-absorber and a condenser, an evaporator common to said machines, means for intermittently heating and cooling said generator-absorbers so that when one generator-absorber is being heated the other is being cooled, said apparatus containing a quantity of inert gas circulating through the machine being cooled whereby the pressure within the machine being cooled is substantially equal to the pressure within the machine being heated.

In testimony whereof I hereto affix my signature.

HARRY B. HULL.